United States Patent [19]

Bertsch

[11] Patent Number: 5,312,956

[45] Date of Patent: May 17, 1994

[54] SYNTHESIS OF LOW VISCOSITY NON-FUNCTIONAL TERMINATED POLYMERS

[75] Inventor: Robert J. Bertsch, Brecksville, Ohio

[73] Assignee: The B. F. Goodrich Company, Akron, Ohio

[21] Appl. No.: 978,183

[22] Filed: Nov. 17, 1992

Related U.S. Application Data

[63] Continuation of Ser. No. 515,801, Apr. 27, 1990, abandoned.

[51] Int. Cl.$^5$ .................. C07C 255/05; C07C 255/33
[52] U.S. Cl. ...................... 558/409; 558/393; 558/395; 558/398; 558/406; 558/442; 558/457; 558/454
[58] Field of Search ............... 558/393, 395, 398, 406, 558/409, 442, 457, 454

[56] References Cited

U.S. PATENT DOCUMENTS

| | | | |
|---|---|---|---|
| 3,426,006 | 2/1969 | Nutzel et al. | 260/83.5 |
| 4,481,148 | 11/1984 | Riew | 558/442 |
| 4,529,558 | 7/1985 | Melchior | 558/442 |

FOREIGN PATENT DOCUMENTS 834303 2/1970 Canada .

OTHER PUBLICATIONS

"Hawley's Condensed Chemical Dictionary", 11th Ed., pp. 938–939, Revised by Sax & Lewis, Sr., (date unknown), Van Nostrand Reinhold.
Morton, Anionic Polymerization: Principles and Practice, (1983), Academic Press, N.Y., pp. 1–85.

*Primary Examiner*—Joseph Paul Brust
*Attorney, Agent, or Firm*—George W. Moxon, II; Debra L. Pawl; Daniel J. Hudak

[57] ABSTRACT

A non-functional liquid rubber is prepared by the solution polymerization of vinyl monomers. The polymer may be a homopolymer or a copolymer. As a copolymer the preferred monomers are a conjugated diene and a vinyl substituted nitrile such as acrylonitrile or methacrylonitrile. A non-functional initiator is employed that is either an azo initiator or a peroxide initiator.

6 Claims, No Drawings

SYNTHESIS OF LOW VISCOSITY NON-FUNCTIONAL TERMINATED POLYMERS

This application is a continuation of application Ser. No. 07/515,801, filed on Apr. 27, 1990, now abandoned.

FIELD OF THE INVENTION

The present invention relates to a new composition of matter and to a process for producing a nonfunctional liquid rubber. This non-functional liquid rubber is prepared by the solution polymerization of a monomer containing at least one double bond in the presence of an initiator.

BACKGROUND ART

Non-functional liquid polymers are known in the art. They are prepared by the emulsion polymerization utilizing emulsifiers, chain transfer agents, initiators, coagulants, and the like. Also utilized are mercaptans which function as chain terminators. The use of a mercaptan, however, causes the non-functional liquid polymers to be turbid and also to have a strong sulfur-like odor.

U.S. Pat. No. 3,426,006 (Nutzel et al., Feb. 4, 1969) relates to a process for producing substantially colorless telomers, homopolymer and copolymer of conjugated diolefins comprising utilizing as a polymerization catalyst a compound of the general formula $$Me-X(R)_y$$

wherein Me is an alkali metal; X is phosphorus, tin or lead; R is a hydrocarbon; and y is 2–3; the Me-X bond being a homopolymer bond.

Canadian Patent No. 834,303 relates to interpolymerizing a butadiene (for example, butadiene, 2,3-dimethyl butadiene, isoprene or chlorobutadiene), and ethylenically unsaturated acid (for example acrylic acid, methacrylic acid, allylic acid, fumaric acid, or itaconic acid) and an acrylonitrile (acrylonitrile or methacrylonitrile). The polymerization is carried out using 0.1 to 0.5 parts of an azo initiator (for example, azobisisobutyronitrile) in aqueous emulsion in the presence of 2.5 to 5 parts of a cationic emulsifier (for example, cetyldimethylbenzyl ammonium chloride) and 5 to 12 parts of a mercaptan modifier (for example, n-dodecyl mercaptan) for 100 parts of monomers. The interpolymerization is short stopped (for example, by 0.15 to 2 parts of hydroxyl ammonium sulfate) at 40 to 80 percent, preferably 65 to 75 percent, conversion to form an emulsion of liquid rubber.

SUMMARY OF THE INVENTION

The present invention relates to a low viscosity liquid polymer composition having improved clarity and a reduced odor. The polymer composition is prepared by the solution polymerization of vinyl monomers containing at least one double bond in the presence of an initiator. Initiators having utility in the composition of this invention are non-functional initiators.

DETAILED DESCRIPTION OF THE INVENTION

The non-functional liquid rubber of the present invention is identified by having a carbon-carbon backbone of homopolymers or copolymers and bearing non-reactive or chemically inert groups at both ends of the polymer chain. Accordingly, the non-functional polymer of the present invention can be generally represented by the following structural formula:

$$Y-PB-Y$$

wherein Y represents a non-reactive terminus and PB represents the carbon-carbon backbone of the polymer.

The non-reactive terminus of the molecule is referred to as such because it will not undergo a condensation or addition reaction.

The backbone of the inventive polymer comprises repeating units made from any monomer which is polymerizable by any free radical reaction mechanism. The repeating unit composition of the polymer backbone may be made from a single monomer (homopolymer) or two or more monomers (copolymer). Preferably, the polymeric backbones are derived from at least one vinyl monomer having at least one terminal vinyl ($CH_2=$) group and up to 18 carbon atoms. Examples of suitable vinyl monomers include (a) dienes containing 4 to 10 carbon atoms, preferably 4 to 8 carbon atoms, such as butadiene, isoprene (2-methyl-1,3-butadiene), 2-isopropyl-1,3-butadiene and chloroprene (2-chloro-1,3-butadiene); (b) vinyl or allyl esters of carboxylic acids containing 2 to 8 carbon atoms such as vinyl acetate, vinyl propionate and allyl acetate; (c) vinyl or allyl ethers of alkyl radicals containing 1 to 8 carbon atoms such as vinyl methyl ether and allyl methyl ether; and (d) acrylates having the formula $$\begin{array}{c} R^1 \ O \\ | \ \| \\ CH_2=C-C-OR^2 \end{array}$$

wherein $R^1$ is hydrogen or an alkyl radical containing 1 to 3 carbon atoms, such as methyl, ethyl, propyl, and isopropyl; $R^2$ is an alkyl radical containing 1 to 18 carbon atoms, preferably 1 to about 8 carbon atoms; or an alkoxyalkyl, alkylthioalkyl, or cyanoalkyl radical containing 2 to 12 carbon atoms, preferably 2 to 8 carbon atoms. Preferably, $R^2$ is an alkyl radical containing 1 to 8 carbon atoms. Suitable acrylates include methyl acrylate, ethyl acrylate, butyl acrylate, hexyl acrylate, 2-ethylhexyl acrylate, dodecyl acrylate, octadecyl acrylate, methoxyethyl acrylate, butoxyethyl acrylate, hexylthioethyl acrylate, a-cyanoethyl acrylate, cyanooctyl acrylate, methyl methacrylate, ethyl methacrylate, octyl methacrylate, and the like. The polymeric backbone may comprise homopolymers of the above vinyl monomers or copolymers of two or more of the monomers.

The vinyl monomers described above may also be polymerized readily with up to about 50 percent by weight, but preferably up to about 35 percent by weight, of at least one vinyl comonomer such as (a) vinyl aromatics having the formula $$\begin{array}{c} H_2C=CR^3 \\ | \\ R^4 \end{array}$$

wherein $R^3$ is hydrogen or methyl and $R^4$ is an aromatic moiety having from 6 to 15 carbon atoms resulting in compounds such as styrene, chlorostyrene, and vinyl toluene; (b) vinyl nitriles having the formula

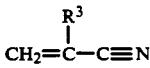

wherein $R^3$ is hydrogen or methyl, resulting in compounds such as acrylonitrile and methacrylonitrile respectively; (c) vinyl amides having the formula

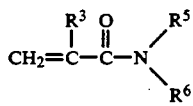

wherein $R^3$ is hydrogen or methyl and $R^5$ and $R^6$ are independently hydrogen or an alkyl group containing from 1 to about 6 carbon atoms; preferably the vinyl amide is acrylamide or methacrylamide; and (d) allyl alcohols having from 3 to 10 carbon atoms.

Examples of suitable polymeric backbones include homopolymers of polyisoprene, polybutadiene, poly(vinyl ethyl ether), poly(ethylacrylate) and poly(butylacrylate); copolymers of butadiene and acrylonitrile, butadiene and styrene, vinyl acetate and methacrylonitrile, vinyl acetate and acrylonitrile, methyl acrylate and methacrylonitrile, methyl acrylate and styrene, methyl acrylate and chlorostyrene, methyl acrylate and allyl alcohol, ethyl acrylate and vinyl toluene, ethyl acrylate and methacrylamide, ethyl acrylate and allyl alcohol, ethyl acrylate and acrylonitrile, ethyl acrylate and methacrylonitrile, ethyl acrylate and styrene, ethyl acrylate and chlorostyrene, ethyl acrylate and allyl alcohol, ethyl acrylate and acrylamide; butyl acrylate and styrene; butyl acrylate and acrylonitrile; terpolymers of ethyl acrylate, styrene and butadiene; and ethyl acrylate, n-butyl acrylate and 2-ethylhexyl acrylate.

One group of preferred low viscosity nonfunctional polymers have copolymeric backbones comprising from about 50 percent to about 99 percent by weight of a diene monomer, such as isoprene or butadiene, and up to about 50 percent by weight of a vinyl nitrile comonomer, such as acrylonitrile, or a vinyl aromatic such as styrene. Desirably the acrylonitrile content is from about 10 percent to about 35 percent. Most desirably, the acrylonitrile content is from about 10 percent to about 26 percent and preferably about 16 percent. These polymers have a number average molecular weight of from about 1,000 to about 20,000.

The greatest advantage provided by non-functional polymers of the present invention is of their preparation. These non-functional polymers are prepared by solution polymerization rather than emulsion polymerization which is the method by which standard nonfunctional polymers are prepared. Several disadvantages exist in emulsion polymerization: the polymers obtained are typically cloudy or turbid and the polymers have a strong sulfur-like odor. The turbidity is due to the utilization of the various additives employed such as emulsifiers, initiators and coagulants, The sulfur odor is due to the employment of a mercapto chain transfer agent.

The present low viscosity non-functional polymers are useful as a toughening and/or flexibilizing agent for any thermoset resin system. Thermoset resins include, but are not limited to, epoxides, phenolics, alkyds and polyesters. Specific system applications include those rich in resin. Resin rich system applications can be at ambient temperatures and include one and two part adhesives, especially adhesives made of thermoset resins such as epoxy, for uses including structural adhesives in the marine, automotive and aircraft industries; electrical and electronic potting compounds and encapsulents; cast pipe; sheet molding compound other than epoxy; and bulk molding compound.

The present inventive low viscosity nonfunctional polymers do not require warming prior to use and will be preferred for applications which must be performed at relatively lower ambient temperatures. Additionally these polymers provide faster air release and better mixing. Therefore these polymers will be preferred for applications involving mixing, which tends to entrap air, which must then be released before continuing, such as with on-site structural repair jobs.

The present invention employs any non-functional azo or peroxide initiator. That is, the initiator becomes part of the final product. Preferably the non-functional azo initiator is a bis-azocyano initiator having the formula

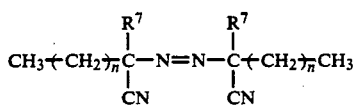

wherein $R^7$ is an alkyl group of 1 to 3 carbon atoms and n is an integer of from 0 to about 6. Such compounds are known and disclosed in U.S. Pat. No. 2,556,876. The preferred bis-azocyano initiators are 2, 2 1 -azobis (2 -methylpropionitrile) also known as AIBN and 2, 2 1 -azobis(2-methylbutyronitrile). The azo initiator decomposes to form $N_2$ gas and free radicals having the formula

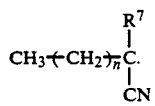

which is represented by Y as the non-reactive terminus of the Y-PB-Y formula. The action of this type of initiator also is due to the fact that the azo carbon-nitrogen bond is readily dissociated, as by thermal means.

The non-functional peroxide initiator preferably is an acyl peroxide having the formula

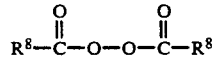

wherein $R^8$ is an aromatic, or an unsubstituted or a substituted alkyl group desirably having from about 1 to about 15 and preferably from about 1 to about 6 carbon atoms. Desirable peroxides include diacetyl peroxide, dilauroyl peroxide, didecanoyl peroxide, and diisononanoyl peroxide, with dibenzoyl peroxide being preferred. The non-functional peroxide initiator decomposes to form $CO_2$ gas and free radicals having the formula $R^8\bullet$ which also is represented by—Y as the nonreactive terminus. The action of the non-functional peroxide initiator is also due to the fact that the peroxide oxygen-oxygen bond is readily dissociated, as by thermal means.

The mole ratio of non-functional initiator: total of starting monomer(s) is from about 1.5 to about 50, preferably 1.8 to about 30, and most preferably 2.0 to about 15. Generally, the greater the amount of initiator to the sum of the monomers, the lower the molecular weight of the non-functional terminated polymer product. The number average molecular weight Mn of the non-functional liquid rubber is from about 1,500 to about 20,000, preferably from about 2,000 to about 7,000 and most preferably from about 3,000 to about 4,000.

The liquid polymerization products of the present invention can be prepared in any solvent that effects solution of the initiators, the monomers or the polymers. The solvent is desirably low boiling so it can be readily removed. Such solvents are generally polar and do not act as chain transfer agents. Examples of such solvents include the various ketones having from 2 to about 10 carbon atoms, various alcohols having from 1 to about 7 carbon atoms, various aromatic compounds having from about 6 to about 10 carbon atoms, various esters of a carboxylic acid wherein the ester portion has up to about 4 carbon atoms and the dicarboxylic acid has from about 2 to about 3 or 4 carbon atoms in the non-ester portion, and various ethers including internal ethers having from about 3 to about 7 carbon atoms. Specific examples of suitable solvents include acetone, methyl ethyl ketone, 2-pentanone, 3-pentanone, methyl isobutyl ketone, methyl alcohol, ethyl alcohol, n-propyl alcohol, isopropyl alcohol, butyl alcohol, isobutyl alcohol, sec-butyl alcohol, tert-butyl alcohol, benzene, toluene, methyl acetate, ethyl acetate, propyl acetate, and tetrahydrofuran. Acetone is preferred.

The reaction temperature may range from about 60° C. to about 150° C., preferably from about 70° C. to about 120° C. The polymerization is carried out under high pressure of up to about 1,520 torrs and preferably up to about 1,200 torrs. The first monomer, solvent, and initiator are added to a vessel and a vacuum is applied to remove air from the system. The vacuum is utilized to pull in the second monomer and the system is then pressurized under heat to effect polymerization.

Those skilled in the art will appreciate that in order to form a polymer having uniform composition throughout the charge and maintain constant molecular weight over the length of the polymerization, the initiator, and comonomers must be continuously metered throughout the polymerization including incremental addition, a plurality of batch additions, etc. Therefore the non-functional polymers of the instant invention are made by a method whereby initially, the reactor is charged with monomers, a small amount of initiator and some of the polymerization solvent. The exact amounts of monomers and initiator will vary depending upon the product polymer, however, the amounts can be readily determined experimentally by conventional methods of calculation. Conventional procedures can be used to recover the resulting reaction products.

No emulsifier, chain transfer agents or coagulants are necessary for this composition. After polymerization it may be desirable to add conventional additives to the polymer, depending upon its end use, such as thermal stabilizers, including Geltrol ® commercially available from The B. F. Goodrich Company, Akron, Ohio, U.S.A.

The polymer formed in an emulsion polymerization contains the above named components as a residue within the finished polymer. It is advantageous to prepare a non-functional liquid rubber by solution polymerization and not have to contend with any residue from the various components.

Hycar 1312 LV, a non-functional polymer prepared by emulsion polymerization, which is commercially available from The Zeon Chemical Company, was utilized as a comparison to the non-functional polymer prepared by solution polymerization of the present invention. The Hycar polymer had a viscosity at 27° C. of 91,400 mPa's, a heat loss (180° C.-2 hours) of 1.61 percent, and a bound acrylonitrile content of approximately 26.4 percent by weight.

EXAMPLE 1

The non-functional polymer of the present invention was obtained in the following manner. A 15 percent AIBN in acetone-water solution was prepared by dissolving 2180 g AIBN in 12,353 g of an acetone-water solution containing 10.5 kg acetone and 1853 g water. A 20 gallon reactor was cooled to 25° C. and evacuated to suck in the AIBN in acetone-water solution, 3.52 Kg acrylonitrile and 5.6 Kg acetone, in sequence. The reactor was evacuated until the acetone boiled (about 510-635 torrs), then pressured to 1,035 torrs with nitrogen. This was repeated and the reactor once again evacuated to 510 torrs. The vacuum was broken by charging 13.7 Kg of butadiene. The mixture was heated to reaction temperature of 75° C. and allowed to react for approximately 20 hours. The reactor was rapidly cooled to 50° C. and any unreacted monomer was slowly vented off. Unreacted monomers were removed by vacuum distillation at 380 torrs. The vacuum was broken, agitation stopped and 6.0 gallons of water were added for coagulation. The contents were then agitated for an additional 30 minutes. Agitation was stopped and the contents allowed to settle for at least about 4 hours. The lower water phase was removed and discarded and 250 g Geltrol was added and mixed for 30 minutes to give the desired nonfunctional liquid rubber. The product had a viscosity at 27° C.=91,400 mPa•s and a bound acrylonitrile content of 26.4 percent. Based on a polystyrene standard, the Mw was 7,200 and Mn was 2,290.

EXAMPLE 2

The non-functional polymer of the present invention was obtained in the following manner. A 16 percent AIBN in acetone-water solution was prepared by dissolving 104 g AIBN in 650 g of an acetone-water solution containing 464 g acetone and 82 g water. A 20 gallon reactor was cooled to 25° C. and evacuated to suck in the AIBN in acetone-water solution, 1.81 Kg acrylonitrile and 5.3 Kg acetone, in sequence. The reactor was evacuated until the acetone boiled (about 510-635 torrs), then pressured to 1,035 torrs with nitrogen. This was repeated and the reactor once again evacuated to 510 torrs. The vacuum was broken by charging 15.0 Kg of butadiene. The mixture was heated to reaction temperature of 85° C. and allowed to react for approximately 20 hours. The reactor was rapidly cooled to 50° C. and any unreacted monomer was slowly vented off. Unreacted monomers were removed by vacuum distillation at 380 torrs. The vacuum was broken, agitation stopped and 6.0 gallons of water were added for coagulation. The contents were then agitated for an additional 30 minutes. Agitation was stopped and the contents allowed to settle for at least about 4 hours. The lower water phase was removed and discarded and 250 g Geltrol was added and mixed for 30 minutes to give the desired nonfunctional liquid rubber. The product had a viscosity at 27° C.=327,000 mPa•s and a bound acrylonitrile content of 17.5 percent. Based on a polystyrene standard, the Mw was 48,300 and Mn was 17,700.

The turbidity of both the control example and Example 1 was determined. The non-functional polymer (4 parts) was dissolved in 6 parts xylene. The solutions so formed were placed in a 10 mm quartz cell and the UV absorbance at 840 Mm was measured. The lower the number, the more transparent (less turbid) is the polymer. The non-functional polymer of the control example had a turbidity value of 0.259 while the nonfunctional polymer of Example 1 had a turbidity value of 0.003, whereas Example 2 had a turbidity value of 0.023. This clearly demonstrates that the non-functional polymer prepared by solution polymerization and employing non-functional initiators has a much lower turbidity value than a non-functional polymer prepared by emulsion polymerization.

Samples were prepared using the product of the instant invention and also the product of the control example. The samples which were tested were cured with DGEBA (diglycidyl ether of bisphenol A) epoxy resin using piperidine as a catalyst. Mechanical property measurements were made by mixing the components of the samples and casting the mixtures into 8x10x0.25 inch (20x25x635 cm) Teflon-coated aluminum molds. They were cured for 16 hours at 120° C. Tensile and Compact Tension specimens were measured from these 0.25 inch (0.635 cm) plaques and tested according to ASTM D-638 and E-399 for mechanical and fracture toughness properties respectively. The results are set forth in Table I. Fracture toughness is represented by $K_{IC}$ and Fracture Energy, which is the energy necessary to propagate a crack through the material, is $G_{IC}$, and glass transition temperature is Tg.

Compositions are prepared using the product of the instant invention and also the product of the control example. The compositions are cured at 120° C. for 16 hours. The components of the compositions and their results are shown in Table I.

TABLE I

| Mechanical Properties of DGEBA Epoxy Resin Cured Using Piperidine As A Catalyst, Containing Non-Functional Polymer | | | | |
|---|---|---|---|---|
| | 1 | 2 | 3 | 4 |
| DGEBA Liquid Epoxy | 100 | 100 | 100 | 100 |
| Product of Ex. 1 | 5 | 10 | 15 | — |
| Product of Control Example | — | — | — | 15 |
| Piperidine | 5 | 5 | 5 | 5 |
| Tensile Strength MPa | 48.7 | 43.2 | 44.5 | 49.1 |
| Elongation % | 9.17 | 15.42 | 9.62 | 5.49 |
| Modulus GPa | 2.631 | 2.433 | 2.304 | 2.285 |
| $K_{IC}$ | 2.073 | 2.157 | 2.090 | 1.719 |
| $G_{IC}$ | 1445 | 1692 | 1676 | 1144 |
| Tg °C. | 81.4 | 85.4 | 85 | 80 |

As seen in Table I, Samples 1, 2 and 3 which employ the product of Example 1 (instant invention all have $KI_c$ (fracture toughness) and $GI_c$ (fracture energy) greater than the sample prepared by emulsion polymerization.

While in accordance with the Patent Statutes, the best mode and preferred embodiment has been set forth, the scope of the invention is not limited thereto, but rather by the scope of the attached claims.

What is claimed is:

1. A low viscosity liquid polymer product having improved clarity and reduced odor having a copolymer backbone comprising from about 50 percent to about 99 percent by weight based on the total weight of the copolymer backbone of a diene monomer, and up to about 50 percent by weight of a vinyl nitrile comonomer or a vinyl aromatic comonomer, said copolymer backbone being derived by free radical solution polymerization utilizing an initiator which provides a non-functional initiator fragment, said initiator being a bis-azocyano initiator having the formula

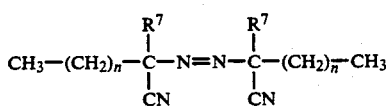

wherein $R^7$ is an alkyl group of 1 to 3 carbon atoms and n is an integer of from 0 to about 6, the initiator being added to said free radical solution polymerization in a mole ratio of initiator to monomers of from about 1.5:50 to about 2.0:15, whereby said copolymer backbone is provided with a non-functional terminus derived from said initiator fragments which undergoes substantially non condensation reaction or addition reaction and further whereby said rubbery polymer has a number average molecular weight of from about 1,500 to about 20,000.

2. A low viscosity liquid polymer as set forth in claim 1 having a number average molecular weight of from about 2,000 to about 7,000.

3. The polymer product of claim 1, wherein the diene monomer is isoprene of butadiene, the vinyl nitrile comonomer is acrylonitrile and the vinyl aromatic comonomer is styrene; wherein said acrylonitrile content is from about 10 percent to about 35 percent by weight based on the total weight of the copolymer; wherein the bis-azocyano initiator is 2,2'-azobis-(2-methylbutyronitrile); wherein the acyl peroxide initiator is dibenzoyl peroxide; and wherein the number average molecular weight of the polymer product is from about 3,000 to about 4,000.

4. The polymer product of claim 3, wherein the acrylonitrile content is from about 10 percent to about 26 percent by weight.

5. The polymer product of claim 3, wherein the acrylonitrile content is about 16 percent by weight.

6. The polymer of claim 1, wherein the diene monomer comprises a diene containing from about 4 to about 10 carbon atoms.

* * * * *